(12) United States Patent
Klinghult

(10) Patent No.: US 7,829,831 B2
(45) Date of Patent: Nov. 9, 2010

(54) CONTROL OF OUTPUT VOLTAGE PROVIDED TO A FLASH UNIT

(75) Inventor: Gunnar Klinghult, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 0 days.

(21) Appl. No.: 12/248,119

(22) Filed: Oct. 9, 2008

(65) Prior Publication Data
US 2010/0059659 A1 Mar. 11, 2010

Related U.S. Application Data

(60) Provisional application No. 61/094,707, filed on Sep. 5, 2008.

(51) Int. Cl.
*G01J 1/32* (2006.01)
*G03B 15/03* (2006.01)
(52) U.S. Cl. .................... 250/205; 396/164; 396/172
(58) Field of Classification Search ............... 250/205; 348/371; 315/150–159; 396/164, 172, 206
See application file for complete search history.

(56) References Cited

U.S. PATENT DOCUMENTS

| | | | | |
|---|---|---|---|---|
| 3,709,123 A * | 1/1973 | Tokutomi | ............... | 396/157 |
| 3,716,752 A * | 2/1973 | Iwata | ............... | 315/151 |
| 3,818,266 A | 6/1974 | Vital et al. | | |
| 4,009,387 A * | 2/1977 | Nuver | ............... | 250/205 |
| 4,190,795 A * | 2/1980 | Schultheis | ............... | 323/285 |
| 4,449,803 A | 5/1984 | Yamada et al. | | |
| 6,295,413 B1 | 9/2001 | Ogasawara | | |
| 6,643,017 B2 * | 11/2003 | Cohen et al. | ............... | 356/328 |
| 2003/0216151 A1 | 11/2003 | Kitano et al. | | |
| 2005/0265709 A1 | 12/2005 | Kim et al. | | |
| 2006/0102614 A1 * | 5/2006 | Kawano et al. | ............... | 219/444.1 |
| 2007/0139550 A1 * | 6/2007 | Takematsu | ............... | 348/371 |
| 2008/0167734 A1 * | 7/2008 | Robinson et al. | ............... | 700/42 |

FOREIGN PATENT DOCUMENTS

GB   2 092 763 A   8/1982

OTHER PUBLICATIONS

Notification of Transmittal of the International Search Report and the Written Opinion of the International Searching Authority, or the Declaration corresponding to PCT/IB2009/050867 mailed on Sep. 2, 2009, 13 pages.

* cited by examiner

*Primary Examiner*—Thanh X Luu
(74) *Attorney, Agent, or Firm*—Harrity & Harrity, LLP

(57) ABSTRACT

A device includes a flash unit to generate light, and an optical sensor to receive the light from the flash unit, and generate a light intensity signal based on the received light. The device also includes a controller to generate a modified error signal based on the light intensity signal. The device further includes a control circuit to receive the modified error signal from the controller, receive an output voltage from a power source associated with the device, control the output voltage based on the modified error signal, and provide the controlled output voltage to the flash unit.

20 Claims, 7 Drawing Sheets

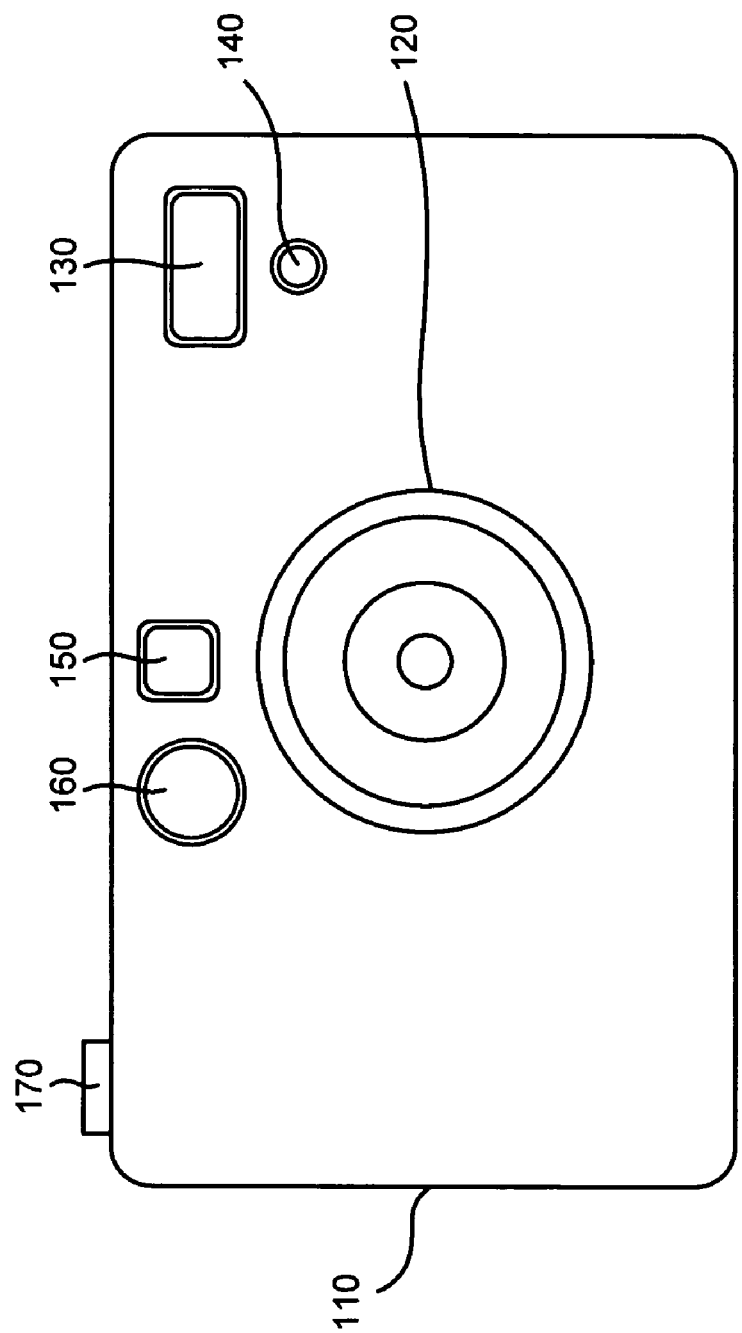

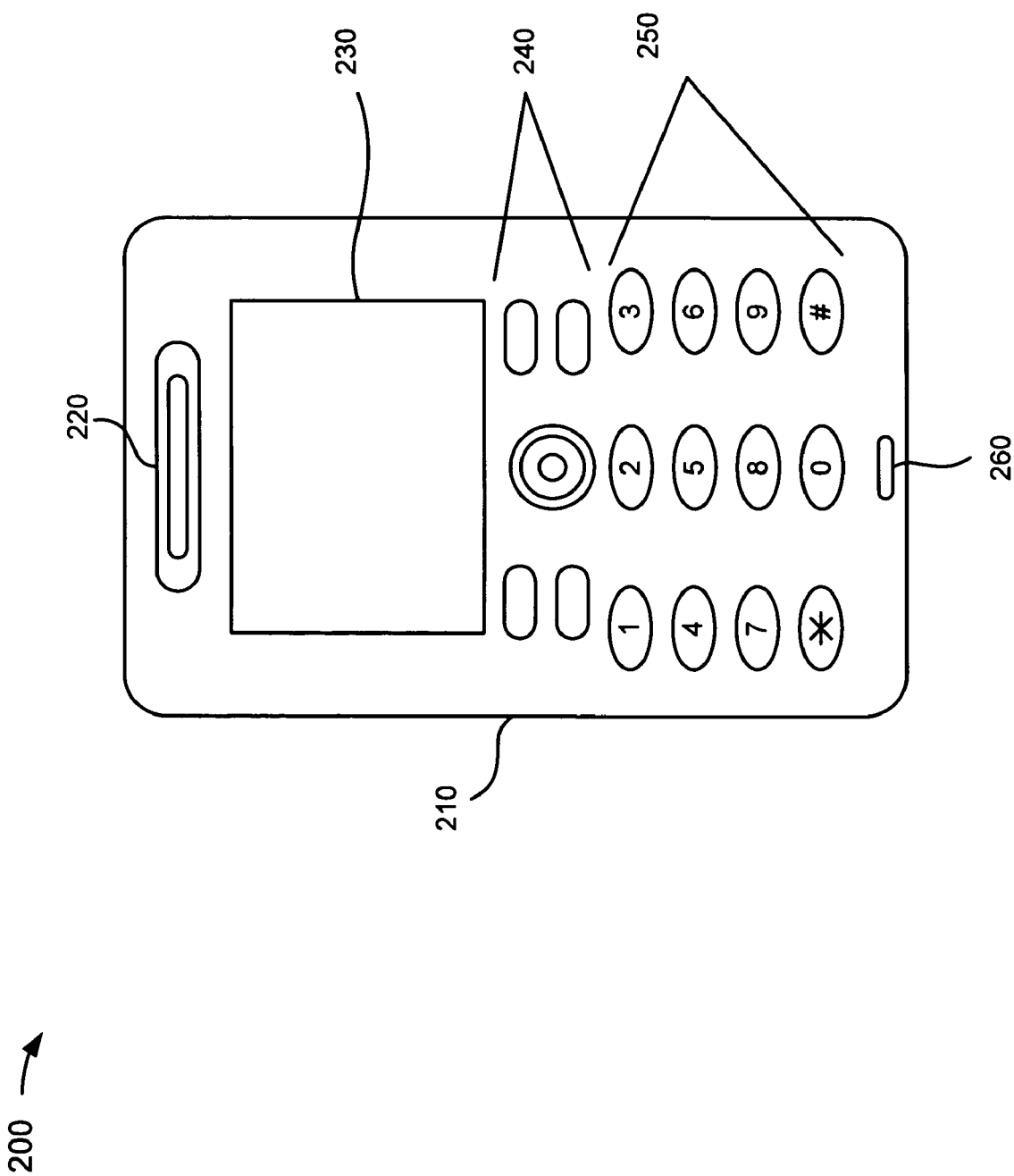

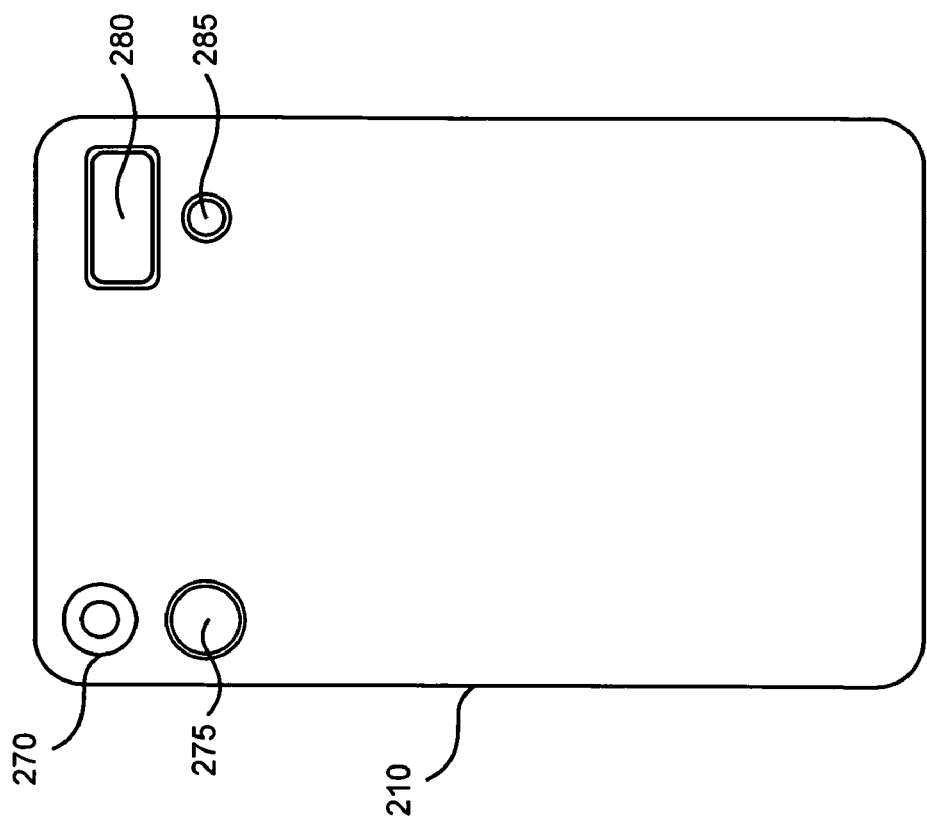

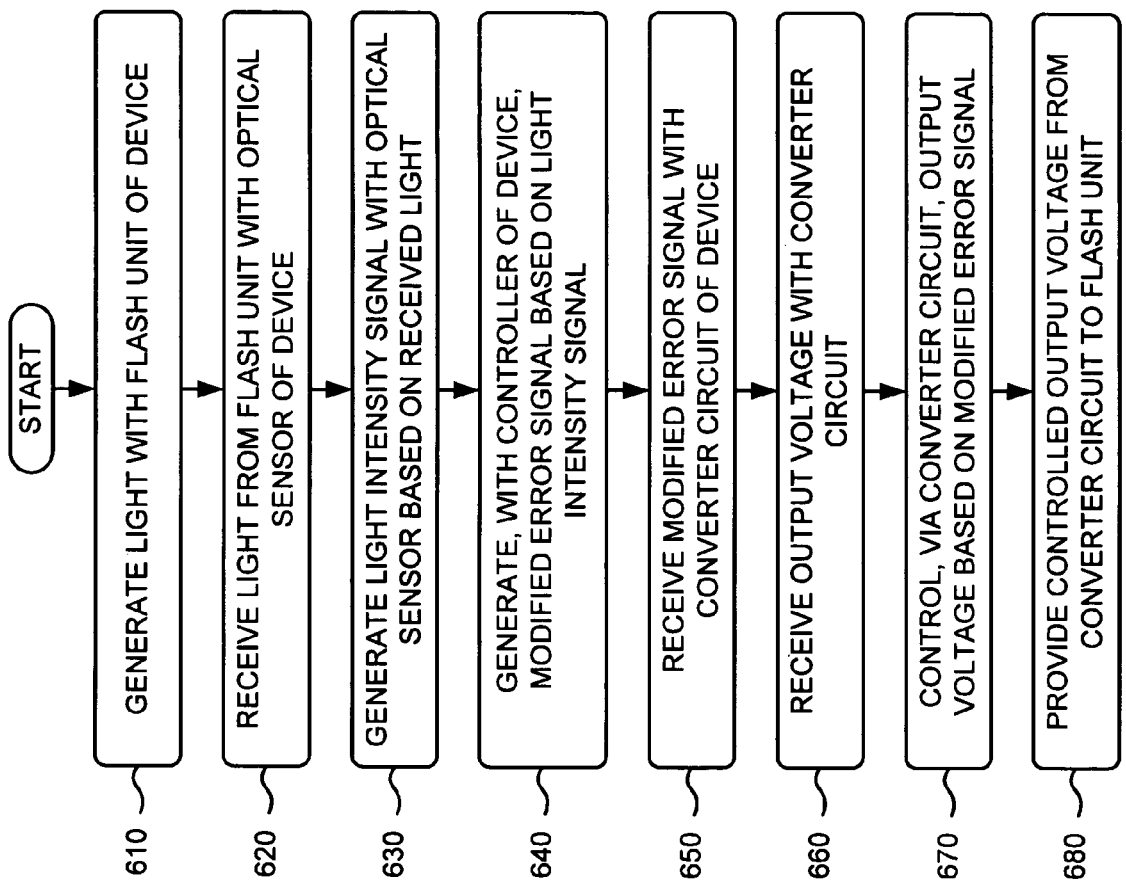

CONTROL OF OUTPUT VOLTAGE PROVIDED TO A FLASH UNIT

RELATED APPLICATION

This application claims priority under 35 U.S.C. §119 based on U.S. Provisional Application No. 61/094,707, filed Sep. 5, 2008, the disclosure of which is incorporated by reference herein in its entirety.

BACKGROUND

Certain devices (e.g., cameras, mobile telephones, etc.) use a flash device or unit (e.g., a flash light-emitting diode (LED)) that is driven by a converter circuit (e.g., a direct current (DC)/DC converter circuit). A constant current circuit keeps current provided through the flash LED at a constant. It is assumed that light intensity is proportional to the current provided through the flash LED. However, the constant current circuit consumes valuable space in such devices, and is expensive due to handling large currents.

The constant current circuit also causes a voltage drop, which consumes power and reduces efficiency. The voltage drop over the constant current circuit can be quite high since the constant current circuit is designed to work with both small currents (e.g., provided to autofocus lights, video lights, etc.) and large currents (e.g., provided to flash devices). Also, the spreading of component tolerances in the devices makes it difficult to lower the voltage drop. For example, in some devices, the current provided to the flash LED is one (1) ampere (A) maximum. The voltage drop over the constant current circuit in these devices is 0.5 volts (V), which means that 0.5 Watts (W) of energy is wasted as heat. In devices that include a flash LED with super capacitors, the current provided to the flash LED is ten (10) amperes (A), which means that five (5) Watts (W) of energy is wasted as heat.

SUMMARY

According to one aspect, a method performed by a device may include generating light with a flash unit associated with the device, receiving light from the flash unit with an optical sensor associated with the device, and generating, with the optical sensor, a light intensity signal based on the received light. The method may also include generating, with a controller associated with the device, a control signal based on the light intensity signal, receiving, by a control circuit associated with the device, the control signal, and receiving, by the control circuit, an output voltage. The method may further include controlling, with the control circuit, the output voltage based on the control signal, and providing the controlled output voltage from the control circuit to the flash unit.

Additionally, the method may include controlling the light generated by the flash unit based on the controlled output voltage.

Additionally, the controller may include a proportional-integral-derivative (PID) controller.

Additionally, the flash unit may be one of integrated with the optical sensor, or located in a same package as the optical sensor.

Additionally, the device may include at least one of a radiotelephone, a personal communications system (PCS) terminal, a laptop, a personal computer, a camera, a video camera with camera capabilities, binoculars, or a telescope.

Additionally, the flash unit may include multiple light-emitting devices, and the method may further include receiving, with the optical sensor, light from one of the multiple light-emitting devices, and generating, with the optical sensor, the light intensity signal based on the light received from one of the multiple light-emitting devices.

Additionally, the light intensity signal may be used to control the light generated by the multiple light-emitting devices.

According to another aspect, a device may include a flash unit to generate light, and an optical sensor to receive the light from the flash unit, and generate a light intensity signal based on the received light. The device may also include a controller to generate a modified error signal based on the light intensity signal. The device may further include a control circuit to receive the modified error signal from the controller, receive an output voltage from a power source associated with the device, control the output voltage based on the modified error signal, and provide the controlled output voltage to the flash unit.

Additionally, the device may include at least one of a radiotelephone, a personal communications system (PCS) terminal, a laptop, a personal computer, a camera, a video camera with camera capabilities, binoculars, or a telescope.

Additionally, the flash unit may be further configured to generate light based on the controlled output voltage.

Additionally, the control circuit may include a direct current to direct current (DC/DC) converter.

Additionally, the controller may include a proportional-integral-derivative (PID) controller.

Additionally, the flash unit may be one of integrated with the optical sensor, or located in a same package as the optical sensor.

Additionally, the flash unit may include multiple light-emitting devices, and the optical sensor may be further configured to receive light from one of the multiple light-emitting devices, and generate the light intensity signal based on the light received from one of the multiple light-emitting devices.

Additionally, the light intensity signal may be used to control the light generated by the multiple light-emitting devices.

Additionally, the flash unit may include a flash light-emitting diode (LED).

Additionally, the control circuit may include one of a digital circuit or an analog circuit.

Additionally, the optical senor may include a sensor that optically receives the light generated by the flash unit and is unaffected by ambient light.

Additionally, the optical sensor may be located a distance from the flash unit so that the light received from the flash unit is unaffected by ambient light.

According to yet another aspect, a device may include means for generating light, means for receiving light from the light generating means, means for generating a light intensity signal based on the received light, means for generating a control signal based on the light intensity signal, means for receiving an output voltage, means for controlling the output voltage based on the control signal, and means for controlling the light generated by the light generating means based on the controlled output voltage.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 1 depicts a diagram of an exemplary device in which systems and/or methods described herein may be implemented;

FIGS. 2A and 2B illustrate front and rear views, respectively, of another exemplary device in which systems and/or methods described herein may be implemented;

FIG. 6 illustrates a flow chart of an exemplary process according to implementations described herein.

DETAILED DESCRIPTION

Figure 3:
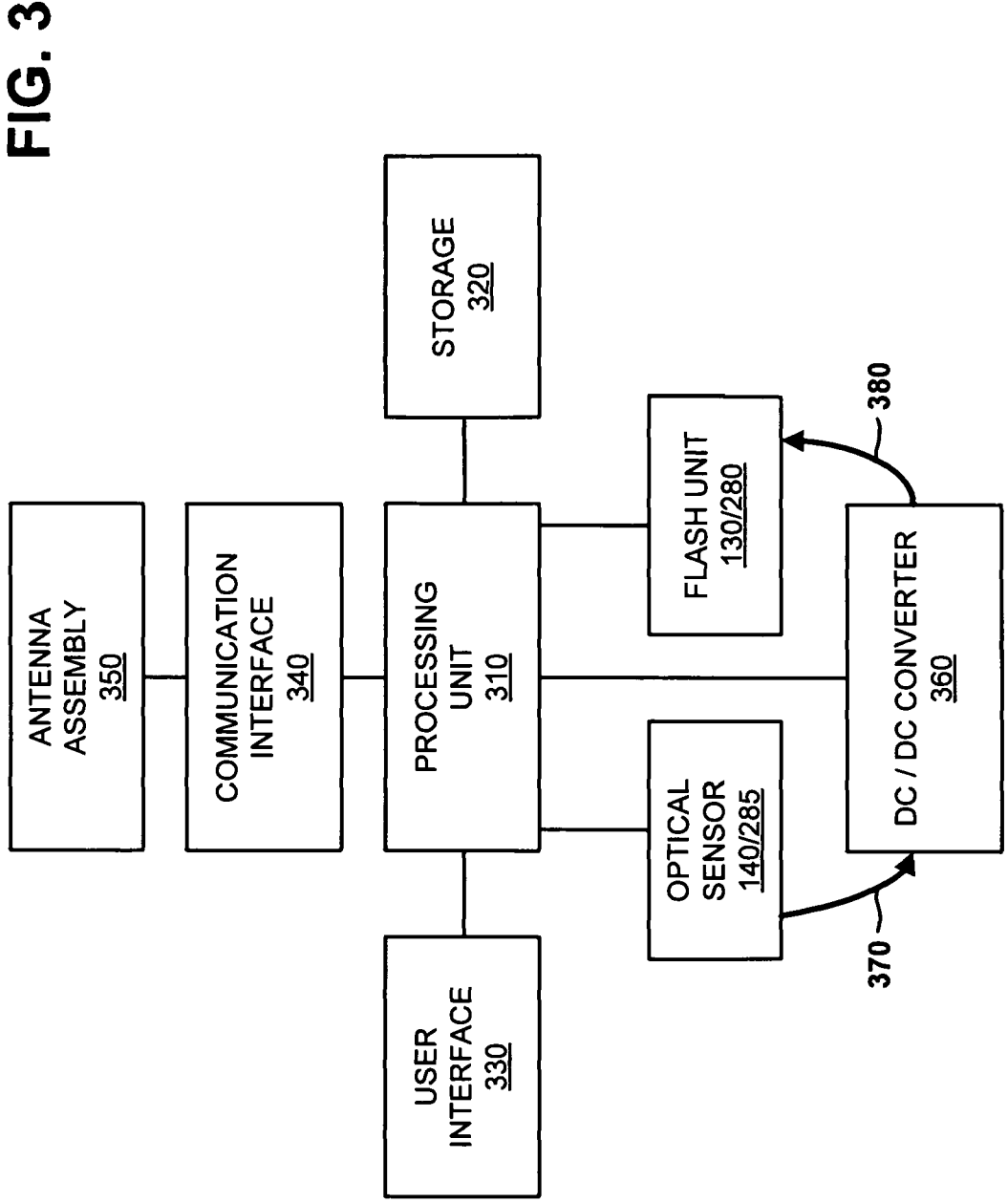
FIG. 3 depicts a diagram of exemplary components of the devices illustrated in FIGS. 1-2B.

The following detailed description refers to the accompanying drawings. The same reference numbers in different drawings may identify the same or similar elements. Also, the following detailed description does not limit the invention.

Overview

Systems and/or methods described herein may provide a device that includes a flash unit, an optical sensor, and a control (or converter) circuit. The optical sensor may monitor light intensity generated by the flash unit, and may provide the light intensity as feedback to the control circuit. The control circuit may use the light intensity to control an output voltage provided to the flash unit. For example, in one implementation, the systems and/or methods may generate light with a flash unit associated with a device, may receive light from the flash unit with an optical sensor associated with the device, and may generate, with the optical sensor, a light intensity signal based on the received light. The systems and/or methods may generate, with a controller associated with the device, a modified error signal based on the light intensity signal, and may receive the modified error signal with a converter circuit associated with the device. The systems and/or methods may further receive an output voltage with the converter circuit, may control, via the converter circuit, the output voltage based on the modified error signal, and may provide the controlled output voltage from the converter circuit to the flash unit.

The description to follow will describe a device. As used herein, a "device" may include a radiotelephone; a personal communications system (PCS) terminal that may combine a cellular radiotelephone with data processing, facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; a personal computer; a camera (e.g., contemporary camera or digital camera); a video camera (e.g., a camcorder with camera capabilities); binoculars; a telescope; and/or any other device capable of utilizing a camera.

As used herein, a "camera" may include a device that may capture and store images and/or video. For example, a digital camera may be an electronic device that may capture and store images and/or video electronically instead of using photographic film as in contemporary cameras. A digital camera may be multifunctional, with some devices capable of recording sound and/or video, as well as images.

Exemplary Device Architectures

FIG. 1 depicts a diagram of an exemplary device 100 in which systems and/or methods described herein may be implemented. As shown in FIG. 1, device 100 may include a housing 110, a lens 120, a flash unit 130, an optical sensor 140, a viewfinder 150, an assist light 160, and a button 170. Housing 110 may protect the components of device 100 from outside elements.

Lens 120 may include a mechanically, electrically, and/or electromechanically controlled assembly of lens(es) whose focal length may be changed, as opposed to a prime lens, which may have a fixed focal length. Lens 120 may include "zoom lenses" that may be described by the ratio of their longest and shortest focal lengths. For example, a zoom lens with focal lengths ranging from 100 millimeters (mm) to 400 mm may be described as a "4×" zoom. Zoom lenses may range, for example, from more than about "1×" to about "12×". Some digital cameras may allow cropping and enlarging of the resultant image once the limits of a zoom lens have been reached, in order to emulate the effect of a longer length focal length zoom lens. There may be a variety of designs for zoom lenses. For example, many zoom lenses may include multiple individual lenses that may be either fixed and/or may slide axially along the body of the lens. If the magnification of the zoom lens changes, movement of the focal plane may be compensated for to keep the focused image sharp. This compensation may be done by mechanical means (e.g., moving the lens assembly as the magnification of the lens changes) and/or optically (e.g., arranging the position of the focal plane to vary as little as possible as the lens is zoomed).

Lens 120 may work in conjunction with an autofocus system (not shown) that may enable lens 120 to obtain the correct focus on a subject, instead of requiring a user of device 100 to manually adjust the focus. The autofocus system may rely on one or more autofocus sensors (not shown) to determine the correct focus. The autofocus system may permit manual selection of the sensor(s), and may offer automatic selection of the autofocus sensor(s) using algorithms which attempt to discern the location of the subject. The data collected from the autofocus sensors may be used to control an electromechanical system that may adjust the focus of the optical system.

Flash unit 130 may include any type of flash units used in cameras. For example, in one implementation, flash unit 130 may include a light-emitting diode (LED)-based flash unit (e.g., a flash unit with one or more LEDs). In other implementations, flash unit 130 may include a flash unit built into device 100; a flash unit separate from device 100; an electronic xenon flash lamp (e.g., a tube filled with xenon gas, where electricity of high voltage is discharged to generate an electrical arc that emits a short flash of light); a microflash (e.g., a special, high-voltage flash unit designed to discharge a flash of light with a sub-microsecond duration); etc.

Optical sensor 140 may include a variety of mechanisms for determining the light intensity generated by flash unit 130 and for metering flash unit 130 based on the determined light intensity. For example, in one implementation, optical sensor 140 may include a sensor separate from and/or integrated with flash unit 130 that determines the light intensity generated by flash unit 130. In one example, optical sensor 140 may be located in a same package as flash unit 130. In another implementation, optical sensor 140 may include a sensor that can determine the light intensity generated by flash unit 130, regardless of ambient light.

Viewfinder 150 may include a window that a user of device 100 may look through to view and/or focus on a subject. For example, viewfinder 150 may include an optical viewfinder (e.g., a reversed telescope); an electronic viewfinder (e.g., a cathode ray tube (CRT), liquid crystal display (LCD), or an organic light-emitting diode (OLED) based display that may be used as a viewfinder and/or to replay previously captured material); or a combination of the aforementioned.

Assist light 160 may include a supplementary lighting system used to aid the autofocus system provided in lens 120 in achieving focus, and to ensure proper exposure in low light conditions. Assist light 160 may include, for example, an autofocus assist light, a video-snapshot exposure assist light, one or more light-emitting diodes (LEDs), one or more white incandescent lights, or another light source that aids in low light conditions.

Button 170 may include a mechanical or electromechanical button that may be used to capture an image of the subject by device 100. If the user of device 100 engages button 170, device 100 may engage lens 120 (and the autofocus system), flash unit 130, optical sensor 140, and assist light 160 in order to capture an image of the subject with device 100.

Although FIG. 1 shows exemplary components of device 100, in other implementations, device 100 may contain fewer, different, or additional components than depicted in FIG. 1. In still other implementations, one or more components of device 100 may perform one or more other tasks described as being performed by one or more other components of device 100.

FIGS. 2A and 2B illustrate front and rear views, respectively, of another exemplary device 200 in which systems and/or methods described herein may be implemented. As shown in FIG. 2A, device 200 may include a housing 210, a speaker 220, a display 230, control buttons 240, a keypad 250, and a microphone 260. Housing 210 may protect the components of device 200 from outside elements. Speaker 220 may provide audible information to a user of device 200.

Display 230 may provide visual information to the user. For example, display 230 may provide information regarding incoming or outgoing calls, media, games, phone books, the current time, etc. In another example, display 230 may provide an electronic viewfinder, e.g., a cathode ray tube (CRT), liquid crystal display (LCD), or an organic light-emitting diode (OLED) based display that a user of device 200 may look through to view and/or focus on a subject and/or to replay previously captured material.

Control buttons 240 may permit the user to interact with device 200 to cause device 200 to perform one or more operations. For example, control buttons 240 may be used to capture an image of the subject by device 200 in a similar manner as button 170 of device 100. Keypad 250 may include a standard telephone keypad. Microphone 260 may receive audible information from the user.

As shown in FIG. 2B, device 200 may further include a camera lens 270, an assist light 275, a flash unit 280, and an optical sensor 285. Camera lens 270 may include components similar to the components of lens 120, and may operate in a manner similar to the manner lens 120 operates. Camera lens 270 may work in conjunction with an autofocus system (not shown) that may enable lens camera lens 270 to obtain the correct focus on a subject, instead of requiring a user of device 200 to manually adjust the focus. The autofocus system may rely on one or more autofocus sensors (not shown) to determine the correct focus. The autofocus system may permit manual selection of the autofocus sensor(s), and may offer automatic selection of the autofocus sensor(s) using algorithms which attempt to discern the location of the subject. The data collected from the autofocus sensors may be used to control an electromechanical system that may adjust the focus of the optical system.

Assist light 275 may include components similar to the components of assist light 160, and may operate in a manner similar to the manner assist light 160 operates. Assist light 275 may include a supplementary lighting system used to aid the autofocus system provided in camera lens 270 in achieving focus, and to ensure proper exposure in low light conditions. Assist light 275 may include, for example, an autofocus assist light, a video/snapshot exposure assist light, one or more light-emitting diodes (LEDs), one or more white incandescent lights, or another light source that aids in low light conditions.

Flash unit 280 may include components similar to the components of flash unit 130, and may operate in a manner similar to the manner flash unit 130 operates. For example, in one implementation, flash unit 280 may include a LED-based flash unit (e.g., a flash unit with one or more LEDs). In other implementations, flash unit 280 may include a flash unit built into device 200; a flash unit separate from device 200; an electronic xenon flash lamp; a microflash; etc.

Optical sensor 285 may include components similar to the components of optical sensor 140, and may operate in a manner similar to the manner optical sensor 140 operates. For example, in one implementation, optical sensor 285 may include a sensor separate from and/or integrated with flash unit 280 that determines the light intensity generated by flash unit 280. In one example, optical sensor 285 may be located in a same package as flash unit 280. In another implementation, optical sensor 285 may include a sensor that can determine the light intensity generated by flash unit 280, regardless of ambient light.

In other implementations, optical sensor 285 may include a sensor provided on the front of flash unit 280 which determines the luminance of the subject (e.g., the amount of flash light reflected back from the subject) and cuts off flash unit 280 once it determines that the subject has been properly illuminated.

Although FIGS. 2A and 2B show exemplary components of device 200, in other implementations, device 200 may contain fewer, different, or additional components than depicted in FIGS. 2A and 2B. In still other implementations, one or more components of device 200 may perform one or more other tasks described as being performed by one or more other components of device 200.

FIG. 3 illustrates a diagram of exemplary components of device 100 or 200. As shown in FIG. 3, device 100/200 may include flash unit 130/280, optical sensor 140/285, a processing unit 310, storage 320, a user interface 330, a communication interface 340, an antenna assembly 350, and a converter circuit 360. Flash unit 130/280 and optical sensor 140/285 may include the features described above in connection with, for example, FIGS. 1-2B.

Processing unit 310 may include a processor, microprocessor, an application specific integrated circuit (ASIC), field programmable gate array (FPGA), or the like. Processing unit 310 may control operation of device 100/200 and its components.

Storage 320 may include a random access memory (RAM), a read only memory (ROM), and/or another type of memory to store data and instructions that may be used by processing unit 310.

User interface 330 may include mechanisms for inputting information to device 100/200 and/or for outputting information from device 100/200. Examples of input and output mechanisms might include a speaker (e.g., speaker 220) to receive electrical signals and output audio signals; a camera lens (e.g., lens 120 or camera lens 270) to receive image and/or video signals and output electrical signals; a microphone (e.g., microphone 260) to receive audio signals and output electrical signals; buttons (e.g., a joystick, button 170, control buttons 240, or keys of keypad 250) to permit data and control commands to be input into device 100/200; a display (e.g., display 230) to output visual information (e.g., image and/or video information received from camera lens 270); and/or a vibrator to cause device 100/200 to vibrate.

Communication interface 340 may include, for example, a transmitter that may convert baseband signals from processing unit 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and/or reception of the RF signals. Antenna assembly 350 may include one or more antennas to transmit and/or receive RF signals over the air. Antenna assembly 350 may, for example, receive RF signals from communication interface 340 and transmit them over the air and receive RF signals over the air and provide them to communication interface 340. In one implementation, for example, communication interface 340 may communicate with a network (e.g., a local area network (LAN), a wide area network (WAN), a telephone network, such as the Public Switched Telephone Network (PSTN), an intranet, the Internet, or a combination of networks).

Converter circuit 360 may include a device that controls output voltage provided by a battery (or any other power source) associated with device 100/200. In one implementation, converter circuit 360 may include a direct current to direct current (DC/DC) converter. A DC/DC converter may include one or more sub-circuits, and a voltage level requirement different than that supplied by the battery (e.g., a voltage level higher or lower than the output voltage, a negative voltage level, etc.). A DC/DC converter may increase voltage provided by a partially lowered battery voltage, which may preclude use of multiple batteries. In one example, converter circuit 360 may receive a control signal (e.g., based on light generated by flash unit 130/280) via optical sensor 140/285, and may receive an output voltage of a battery (not shown) or another component associated with device 100/200. Converter circuit 360 may control the output voltage using the control signal. Converter circuit 360 may provide the controlled output voltage to flash unit 130/280 in order to control the light intensity generated by flash unit 130/280. In one implementation, the light intensity generated by flash unit 130/280 may be maintained at a constant, predetermined level.

As further shown in FIG. 3, optical sensor 140/285 may determine information 370 regarding the light intensity generated by flash unit 130/280, and may provide light intensity information 370 to converter circuit 360. In one implementation, light intensity information 370 may be used to adjust the output or light intensity generated by flash unit 130/280 so that flash unit 130/280 may be controlled. Converter circuit 360 may receive light intensity information 370 from optical sensor 140/285, and may receive an output voltage (not shown). Converter circuit may control the output voltage using light intensity information 370, and may provide a controlled output voltage 380 to flash unit 130/280. Controlled output voltage 380 may be used to adjust the output or light intensity generated by flash unit 130/280 so that flash unit 130/280 may be controlled.

As will be described in detail below, device 100/200 may perform certain operations relating to control of flash unit 130/280 based on light intensity information 370 provided by optical sensor 140/285. Device 100/200 may perform these and other operations in response to processing unit 310 executing software instructions of an application contained in a computer-readable medium, such as storage 320. A computer-readable medium may be defined as a physical or logical memory device.

The software instructions may be read into storage 320 from another computer-readable medium or from another device via communication interface 340. The software instructions contained in storage 320 may cause processing unit 310 to perform processes that will be described later. Alternatively, hardwired circuitry may be used in place of or in combination with software instructions to implement processes consistent with principles of the invention. Thus, implementations described herein are not limited to any specific combination of hardware circuitry and software.

Although FIG. 3 shows exemplary components of device 100/200, in other implementations, device 100/200 may contain fewer, different, or additional components than depicted in FIG. 3. In still other implementations, one or more components of device 100/200 may perform one or more other tasks described as being performed by one or more other components of device 100/200.

Exemplary Device Operation

Figure 4:
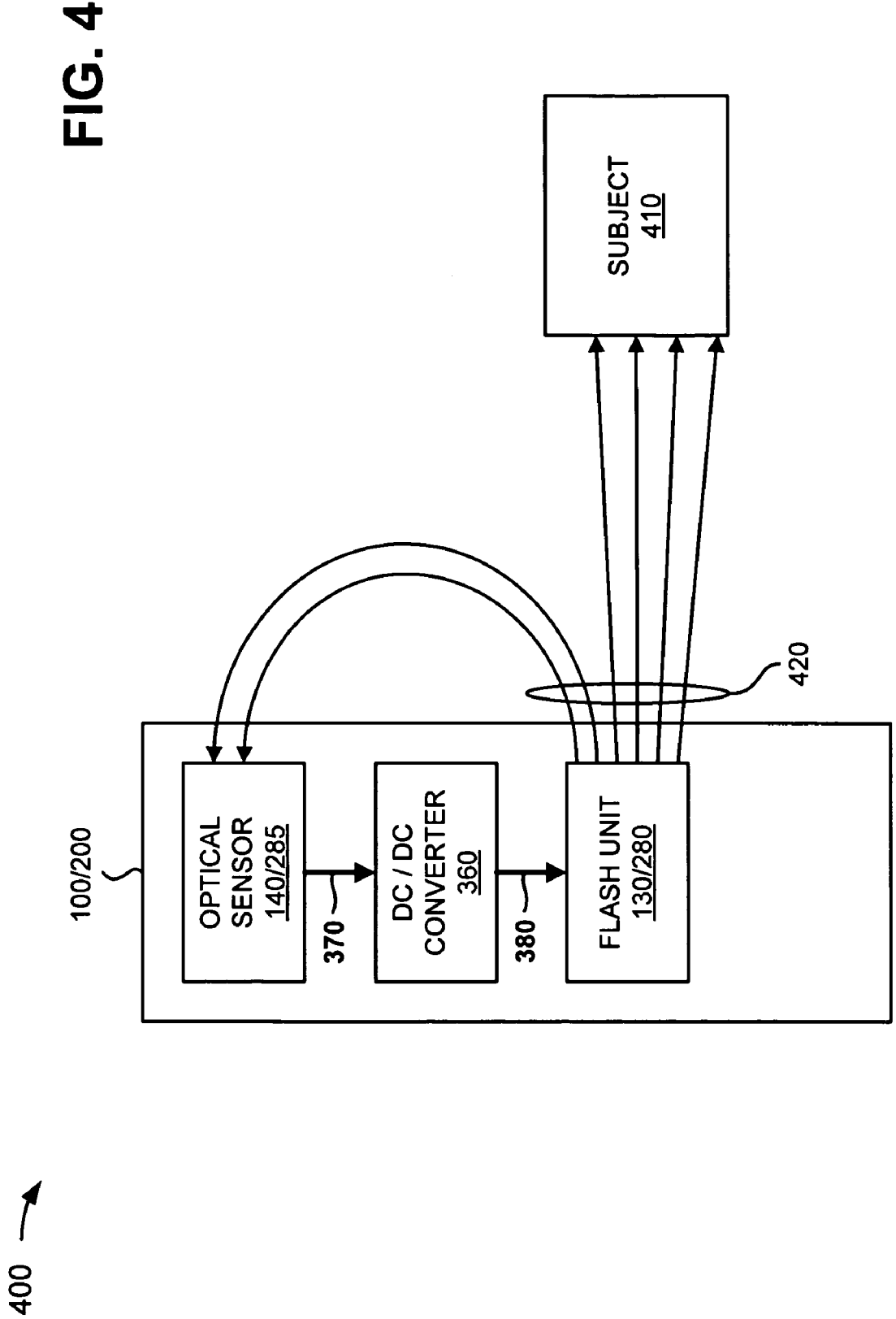
FIG. 4 illustrates a diagram of an exemplary operation of the devices depicted in FIGS. 1-2B.

FIG. 4 illustrates a diagram of an exemplary operation 400 of device 100/200. As shown, device 100/200 may be arranged with a subject 410, e.g., so that device 100/200 may capture an image of subject 410. In one implementation, flash unit 130/280 may generate light 420 to illuminate subject 410, and optical sensor 140/285 may receive light 420 generated by flash unit 130/280. In one example, optical sensor 140/285 may be located near or approximately near flash unit 130/280. In another example, optical sensor 140/285 may be integrated with flash unit 130/280 and/or located in a same package as flash unit 130/280. Optical sensor 140/285 may be positioned so that a sufficient portion of light 420 generated by flash unit 130/280 may be received by optical sensor 140/285, and so that ambient light may not affect the intensity of light 420.

Optical sensor 140/285 may determine light intensity information 370 based on the received light 420, and may provide light intensity information 370 to converter circuit 360. Converter circuit 360 may receive light intensity information 370 from optical sensor 140/285, and may receive an output voltage (not shown). Converter circuit 360 may control the output voltage using light intensity information 370, and may provide controlled output voltage 380 to flash unit 130/280. Controlled output voltage 380 may be used to adjust the light intensity (e.g., the intensity of light 420) generated by flash unit 130/280 so that flash unit 130/280 may be controlled. In one exemplary implementation, if flash unit 130/280 includes several light-emitting devices (e.g., several LEDs), converter circuit 360 may control all of the light-emitting devices by monitoring light (e.g., via optical sensor 140/285) generated by a single light-emitting device.

Although FIG. 4 shows exemplary operations of device 100/200, in other implementations, device 100/200 may perform fewer, different, or additional operations than depicted in FIG. 4. In still other implementations, one or more components of device 100/200 may perform one or more other tasks described as being performed by one or more other components of device 100/200.

Figure 5:
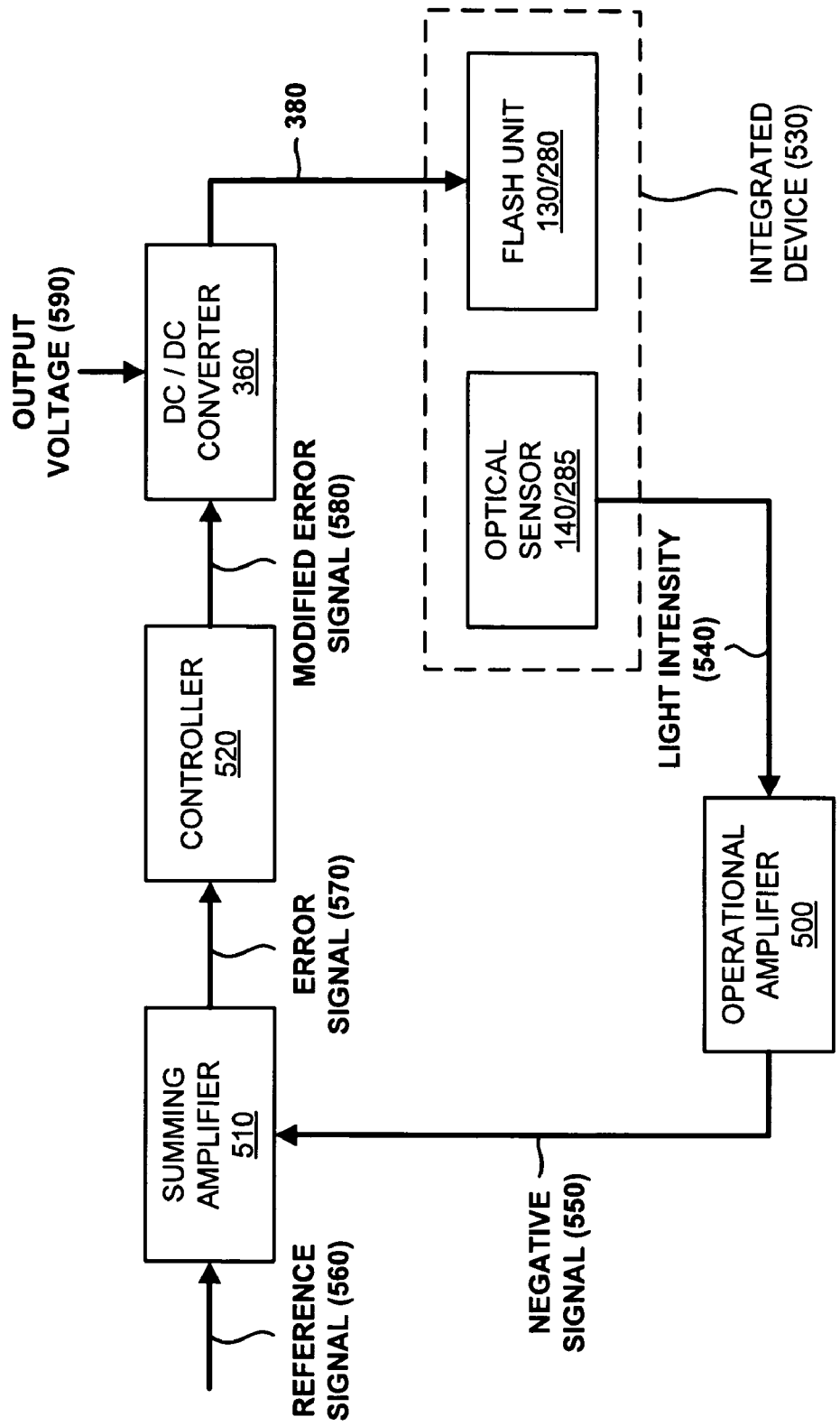
FIG. 5 depicts a diagram of exemplary components of the devices illustrated in FIGS. 1-2B.

FIG. 5 depicts a diagram of exemplary components of device 100/200. As illustrated, device 100/200 may include flash unit 130/280, optical sensor 140/285, converter circuit 360 an operational amplifier 500, a summing amplifier 510, and a controller 520. Flash unit 130/280, optical sensor 140/285, and converter circuit 360 may include the features described above in connection with, for example, FIGS. 1-4. As further shown in FIG. 5, in one implementation, flash unit 130/280 may be integrated with optical sensor 140/285 and/or located in a same package with optical sensor 140/285, as an integrated device 530.

Operational amplifier 500 may include a device that includes an inverting function. The inverting function may receive a signal, and may invert (or make negative) the signal. For example, as shown in FIG. 5, operational amplifier 500 may receive a light intensity signal 540 generated by optical sensor 140/285. Light intensity signal 540 may include a voltage signal that provides an indication of light intensity received from flash unit 130/280 by optical sensor 140/285. Operational amplifier 500 may invert light intensity signal 540, and may output a negative (or inverted) voltage signal 550 that may be equal to a negative value of light intensity signal 540. Operational amplifier 500 may provide negative signal 550 to summing amplifier 510.

Summing amplifier 510 may include a device that receives negative signal 550 from operational amplifier 500, and receives a reference signal 560 (e.g., from processing unit 310). Reference signal 560 may include a voltage signal, may vary based on specific components of device 100/200, and may be adjusted accordingly (e.g., reference signal 560 may be adjusted so that flash unit 130/280 may receive a certain amount of output voltage). Summing amplifier 510 may add negative signal 550 and reference signal 560 together, and may output the sum as an error signal 570. In one example, if negative signal 550 equals reference signal 560 (e.g., in a situation where light intensity 540 may be optimal), error signal 570 may equal zero and no adjustments may be necessary for flash unit 130/280. Summing amplifier 510 may provide error signal 570 to controller 520.

Controller 520 may include a device that may ensure that flash unit 130/280 is not unstable and does not have a false and/or unpredictable response time. For example, in one implementation, controller 520 may include a proportional-integral-derivative (PID) controller. A PID controller may attempt to correct an error between a measured process variable and a desired set point by calculating and outputting a corrective action that can adjust the process accordingly. As shown in FIG. 5, controller 520 may receive error signal 570 from summing amplifier 510, and may attempt to correct error signal 570 by outputting a modified error signal 580. Modified error signal 580 may include corrective information that can adjust the output of flash unit 130/280. Controller 520 may provide modified error signal 580 to converter circuit 360.

Converter circuit 360 may receive modified error signal 580 and an output voltage 590 (e.g., from a battery or another component associated with device 100/200), and may use modified error signal 580 to control power (e.g., output voltage 590) provided to flash unit 130/280. For example, modified error signal 580 may be used to control or regulate output voltage 590, and converter circuit 360 may provide the controlled/regulated voltage (e.g., controlled output voltage 380) to flash unit 130/280. Flash unit 130/280 may receive controlled output voltage 380, and may adjust the output or light intensity generated based on controlled output voltage 380. In one example, controlled output voltage 380 may ensure that flash unit 130/280 may be controlled.

The control loop described in connection with FIG. 5 may be either analog or digital. An analog control loop may provide simplicity and/or speed. A digital control loop may make it easier to model nonlinearities in the control loop (e.g., provided by flash unit 130/280). The control loop described herein may also enable converter circuit 360 to be significantly smaller since the constant current circuit, used in certain devices, is unnecessary. Control of the light intensity generated by flash unit 130/280 may be more precise with the control loop since the control loop may be based on actual light generated by flash unit 130/280, rather than on the current. The control loop described herein may minimize variations due to temperature and individual spread, and may increase overall efficiency of device 100/200 since power may not be converted to heat (e.g., as is the case with the constant current circuit).

Exemplary Process

FIG. 6 illustrates a flowchart of an exemplary process 600 according to implementations described herein. In one implementation, process 600 may be performed by one or more components of device 100/200.

As illustrated in FIG. 6, process 600 may begin with generation of light by a flash unit associated with a device (block 610), and receipt of the light from the flash unit by an optical sensor associated with the device (block 620). For example, in implementations described above in connection with FIG. 4, flash unit 130/280 may generate light 420 to illuminate subject 410, and optical sensor 140/285 may receive light 420 generated by flash unit 130/280. In one example, optical sensor 140/285 may be positioned so that a sufficient portion of light 420 generated by flash unit 130/280 may be received by optical sensor 140/285, and so that ambient light may not affect the intensity of light 420.

As further shown in FIG. 6, a light intensity signal may be generated by the optical sensor based on the received light (block 630), and a modified error (or control) signal may generated, based on the light intensity signal, by a controller associated with the device (block 640). For example, in implementations described above in connection with FIG. 5, light intensity signal 540 may be generated by optical sensor 140/285, and may include a voltage signal that provides an indication of light intensity received from flash unit 130/280 by optical sensor 140/285. Operational amplifier 500 may invert light intensity signal 540, and may output negative signal 550. Summing amplifier 510 may add negative signal 550 and reference signal 560, and may output the sum as error signal 570. Controller 520 may receive error signal 570 from summing amplifier 510, and may attempt to correct error signal 570 by outputting modified error signal 580. Modified error signal 580 may include corrective information that can adjust the output of flash unit 130/280.

Returning to FIG. 6, a converter circuit associated with the device may receive the modified error (or control) signal (block 650), and the converter circuit may receive an output voltage (block 660). For example, in implementations described above in connection with FIG. 5, converter circuit 360 may receive modified error signal 580 and output voltage 590 (e.g., from a battery or another component associated with device 100/200).

As further shown in FIG. 6, the converter circuit may control the output voltage based on the modified error (or control) signal (block 670), and the controlled output voltage may be provided from the converter circuit to the flash unit (block 680). For example, in implementations described above in connection with FIG. 5, converter circuit 360 may use modified error signal 580 to control power (e.g., output voltage 590) provided to flash unit 130/280. In one example, modified error signal 580 may be used to control or regulate output voltage 590, and converter circuit 360 may provide the controlled/regulated voltage (e.g., controlled output voltage 380) to flash unit 130/280. Flash unit 130/280 may receive controlled output voltage 380, and may adjust the output or light intensity generated based on controlled output voltage 380.

Conclusion

Systems and/or methods described herein may provide a device that includes a flash unit, an optical sensor, and a control (or converter) circuit. The optical sensor may monitor light intensity generated by the flash unit, and may provide the light intensity as feedback to the control circuit. The control circuit may use the light intensity to control an output voltage provided to the flash unit. For example, in one implementation, the systems and/or methods may generate light with a flash unit associated with a device, may receive light from the flash unit with an optical sensor associated with the device, and may generate, with the optical sensor, a light intensity signal based on the received light. The systems and/or methods may generate, with a controller associated with the device, a modified error signal based on the light intensity signal, and may receive the modified error signal with a converter circuit associated with the device. The systems and/or methods may further receive an output voltage with the converter circuit, may control, via the converter circuit, the output voltage based on the modified error signal, and may provide the controlled output voltage from the converter circuit to the flash unit.

The foregoing description of implementations provides illustration and description, but is not intended to be exhaustive or to limit the invention to the precise form disclosed. Modifications and variations are possible in light of the above teachings or may be acquired from practice of the invention.

For example, while a series of blocks has been described with regard to FIG. 6, the order of the blocks may be modified in other implementations. Further, non-dependent blocks may be performed in parallel.

Although the detailed description described using an optical sensor (e.g., optical sensor 140/285) to measure the light intensity generated by flash unit 130/280, in other implementations, device 100/200 may utilize other sensors capable of measuring the light intensity generated by flash unit 130/280.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used herein is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, the method comprising:
    generating light with a flash unit associated with the device;
    receiving, directly from the flash unit, the generated light with an optical sensor associated with the device;
    generating, with the optical sensor, a light intensity signal based on the received light received directly from the flash unit;
    inverting the generated light intensity signal to generate an inverted light intensity signal;
    generating, with a controller associated with the device, a control signal based on the inverted light intensity signal and a reference signal that is based on one or more particular components of the device;
    receiving, by a control circuit associated with the device, the generated control signal;
    receiving, by the control circuit, an output voltage;
    controlling, with the control circuit, the output voltage based on the generated control signal;
    providing the controlled output voltage from the control circuit to the flash unit; and
    controlling the light generated by the flash unit based on the controlled output voltage.

2. The method of claim 1, where the controller comprises a proportional-integral-derivative (PID) controller.

3. The method of claim 1, where the flash unit is one of:
    integrated with the optical sensor; or
    located in a same package as the optical sensor.

4. The method of claim 1, where the device includes at least one of:
    a radiotelephone;
    a personal communications system (PCS) terminal;
    a laptop;
    a personal computer;
    a camera;
    a video camera with camera capabilities;
    binoculars; or
    a telescope.

5. The method of claim 1, where the flash unit includes a plurality of light-emitting devices, and the method further comprises:
    receiving, with the optical sensor, light directly from one of the plurality of light-emitting devices; and
    generating, with the optical sensor, the light intensity signal based on the light directly received from the one of the plurality of light-emitting devices.

6. The method of claim 5, where the light intensity signal is used to control the light generated by the plurality of light-emitting devices.

7. A device comprising:
    a flash unit to generate light;
    an optical sensor to:
        receive at least a portion of the generated light directly from the flash unit, and generate a light intensity signal based on the at least portion of the generated light received directly from the flash unit;

a controller to:
receive an error signal generated based on a sum of a reference signal and an inverted signal of the generated light intensity signal, and
generate a modified error signal based on the error signal; and a control circuit to:
receive the modified error signal from the controller,
receive an output voltage from a power source associated with the device,
control the output voltage based on the modified error signal, and
provide the controlled output voltage to the flash unit,
where the flash unit adjusts an intensity of the light generated by the flash unit based on the provided controlled output voltage.

8. The device of claim 7, where the device includes at least one of:
a radiotelephone,
a personal communications system (PCS) terminal,
a laptop,
a personal computer,
a camera,
a video camera with camera capabilities,
binoculars, or
a telescope.

9. The device of claim 7, where the flash unit is further to:
generate light based on the controlled output voltage.

10. The device of claim 7, where the control circuit comprises a direct current to direct current (DC / DC) converter.

11. The device of claim 10, where the controller comprises a proportional-integral-derivative (PID) controller.

12. The device of claim 7, where the flash unit is one of:
integrated with the optical sensor, or
located in a same package as the optical sensor.

13. The device of claim 7, where the flash unit includes a plurality of light-emitting devices, and the optical sensor is further to:

receive light directly from one of the plurality of light-emitting devices, and
generate the light intensity signal based on the light received directly from the one of the plurality of light-emitting devices,
where the light intensity signal is used to control the light generated by the plurality of light-emitting devices.

14. The device of claim 7, where the flash unit comprises a flash light-emitting diode (LED).

15. The device of claim 7, where the control circuit comprises one of a digital circuit or an analog circuit.

16. The device of claim 7, where the optical sensor comprises a sensor that optically receives the light generated by the flash unit and is unaffected by ambient light.

17. A device comprising:
a flash unit to generate light;
an optical sensor to:
receive, directly from the flash unit, the generated light, and
generate a light intensity signal based on the received light received directly from the flash unit;

a controller to:
generate a control signal based on an inverted signal, of the generated light intensity signal, and a reference signal that is based on at least one component of the device; and a control circuit to:
receive the generated control signal,
receive an output voltage,
control the output voltage based on the generated control signal, and
provide the controlled output voltage to the flash unit,
where the light, generated by the flash unit, is controlled based on the controlled output voltage.

18. The system of claim 17, where the flash unit comprises a flash light-emitting diode (LED).

19. The system of claim 17, where the control circuit comprises one of a digital circuit or an analog circuit.

20. The system of claim 17, where the optical sensor comprises a sensor that optically receives the light generated by the flash unit, without being affected by ambient light.

* * * * *